(12) United States Patent
Schlotterer et al.

(10) Patent No.: US 8,654,496 B2
(45) Date of Patent: Feb. 18, 2014

(54) TRIP UNIT INCLUDING SEPARABLE COMPONENT TO SAVE AND RESTORE SETTINGS, AND CIRCUIT BREAKER INCLUDING THE SAME

(75) Inventors: John C. Schlotterer, Murrysville, PA (US); Arthur A. Anderson, Vandergrift, PA (US); Randal P. Shvach, Conway, PA (US)

(73) Assignee: Eaton Corporation, Cleveland, OH (US)

( * ) Notice: Subject to any disclaimer, the term of this patent is extended or adjusted under 35 U.S.C. 154(b) by 348 days.

(21) Appl. No.: 13/107,143

(22) Filed: May 13, 2011

(65) Prior Publication Data

US 2012/0287543 A1 Nov. 15, 2012

(51) Int. Cl.
*H02H 3/08* (2006.01)
(52) U.S. Cl.
USPC ........................................ 361/93.2
(58) Field of Classification Search
USPC ........................................ 361/93.2
See application file for complete search history.

(56) References Cited

U.S. PATENT DOCUMENTS

| | | | |
|---|---|---|---|
| 4,644,547 A | 2/1987 | Vercellotti et al. | |
| 4,644,566 A | 2/1987 | Vercellotti et al. | |
| 4,653,073 A | 3/1987 | Vercellotti et al. | |
| 5,315,531 A | 5/1994 | Oravetz et al. | |
| 5,548,523 A | 8/1996 | Wehrli, III et al. | |
| 5,627,716 A | 5/1997 | Lagree et al. | |
| 5,815,364 A | 9/1998 | Hurley et al. | |
| 5,943,201 A * | 8/1999 | Walker et al. | 361/64 |
| 6,005,757 A * | 12/1999 | Shvach et al. | 361/64 |
| 6,055,145 A | 4/2000 | Lagree et al. | |
| 2003/0048589 A1* | 3/2003 | Tignor et al. | 361/93.3 |
| 2003/0193767 A1* | 10/2003 | Vicente et al. | 361/93.1 |
| 2004/0066595 A1* | 4/2004 | Tignor et al. | 361/93.1 |
| 2005/0057870 A1 | 3/2005 | Stellato et al. | |

FOREIGN PATENT DOCUMENTS

EP 1 294 068 A2 3/2003

OTHER PUBLICATIONS

European Patent Office, "International Search Report and Written Opinion", Dec. 3, 2012, 11 pp.

* cited by examiner

*Primary Examiner* — Jared Fureman
*Assistant Examiner* — Nicholas Ieva
(74) *Attorney, Agent, or Firm* — Eckert Seamans Cherin & Mellott, LLC; Kirk D. Houser

(57) ABSTRACT

A circuit breaker includes separable contacts, an operating mechanism to open and close the contacts, and a trip unit cooperating with the operating mechanism to trip open the contacts. The trip unit includes a first component having a processor and a first memory storing a first set of a plurality of trip unit settings, and a second component of the trip unit. The second component is separable from the first component or the trip unit, and includes a second memory storing a second set of a plurality of trip unit settings. The second component saves the first set of the plurality of trip unit settings as the second set of the plurality of trip unit settings in the second memory, and restores the second set of the plurality of trip unit settings in the first memory of the first component or of another first component of another trip unit.

1 Claim, 4 Drawing Sheets

TRIP UNIT INCLUDING SEPARABLE COMPONENT TO SAVE AND RESTORE SETTINGS, AND CIRCUIT BREAKER INCLUDING THE SAME

BACKGROUND

1. Field

The disclosed concept pertains generally to trip units and, more particularly, to trip units including a plurality of trip unit settings. The disclosed concept also pertains to circuit breakers including a trip unit.

2. Background Information

Many of today's relatively large circuit breakers include relatively complex electronic trip units that are field replaceable. Often, the number of adjustable settings is sufficiently large such that it is impractical to provide mechanical adjustment of the various settings. The settings are adjusted electronically (e.g., through an operator panel on the trip unit; by an external programming device; remotely through a communication network (e.g., field bus)). In turn, the settings are electronically stored in the trip unit.

When a trip unit fails and, thus, must be replaced, it is often difficult or impossible to determine or retrieve the current settings stored in the failed trip unit. Even if the current settings are known, it is laborious to re-enter those settings in a replacement trip unit.

U.S. Pat. No. 6,005,757 discloses a first or apprentice trip unit interconnected with a second or master trip unit to acquire at least one predetermined setting from the second trip unit. In this manner, there is no requirement to employ some other intelligence, such as that of a user or host computer, to program the first trip unit. Instead, the first trip unit is configured without the substantial involvement of the user and without requiring the presence or expense of a host computer.

There is room for improvement in circuit breakers including a trip unit.

There is also room for improvement in trip units for circuit breakers.

SUMMARY

These needs and others are met by embodiments of the disclosed concept, which save a copy of trip unit settings in a component separable from the trip unit, such as, for example and without limitation, a communication adapter module (CAM).

In accordance with one aspect of the disclosed concept, a trip unit comprises: a first component comprising a processor and a first memory storing a first set of a plurality of trip unit settings; and a second component of the trip unit, the second component being separable from the first component or being separable from the trip unit, the second component comprising a second memory storing a second set of a plurality of trip unit settings, the second component being structured to save the first set of the plurality of trip unit settings as the second set of the plurality of trip unit settings in the second memory, and to restore the second set of the plurality of trip unit settings in the first memory of the first component or of another first component of another trip unit.

As another aspect of the disclosed concept, a circuit breaker comprises: separable contacts; an operating mechanism structured to open and close the separable contacts; and a trip unit cooperating with the operating mechanism to trip open the separable contacts, the trip unit comprising: a first component comprising a processor and a first memory storing a first set of a plurality of trip unit settings, and a second component of the trip unit, the second component being separable from the first component or being separable from the trip unit, the second component comprising a second memory storing a second set of a plurality of trip unit settings, the second component being structured to save the first set of the plurality of trip unit settings as the second set of the plurality of trip unit settings in the second memory, and to restore the second set of the plurality of trip unit settings in the first memory of the first component or of another first component of another trip unit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a digital signal processor (DSP); a microprocessor; a microcontroller; a microcomputer; a central processing unit; a mainframe computer; a mini-computer; a server; a networked processor; a programmable logic device (PLD); a combination of a plurality of logic gates; or any suitable processing device or apparatus.

As employed herein, the term "setting" means setpoint, value, numeric value, digital or boolean state, character(s) such as alphabetic character(s) and/or alpha-numeric character(s), or other representations of operating features and/or user-interface configurations of a trip unit. Non-limiting examples of settings include system data; current curve setpoint values; voltage setpoint values; settings for alarms, and auxiliary relays.

As employed herein, the term "predetermined setting" means those settings which are predetermined such as, for example, through programming, configuration, entry or adjustment by a user or programming device.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a four-pole circuit breaker, although the disclosed concept is applicable to circuit breakers having any number of poles.

Figure 1A:
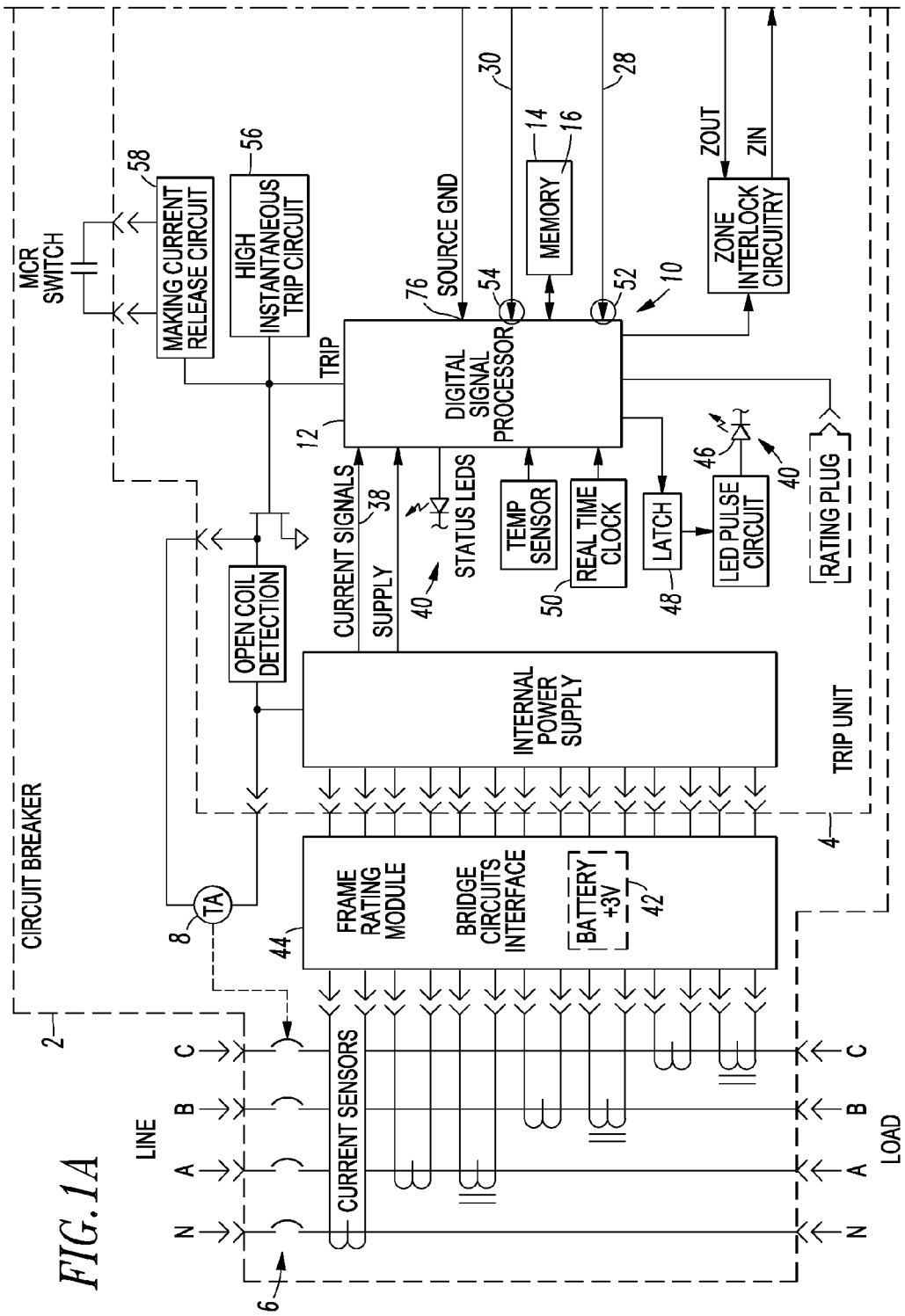
FIGS. 1A-1B form a block diagram of a circuit breaker including a trip unit in accordance with embodiments of the disclosed concept.
Figure 1B:
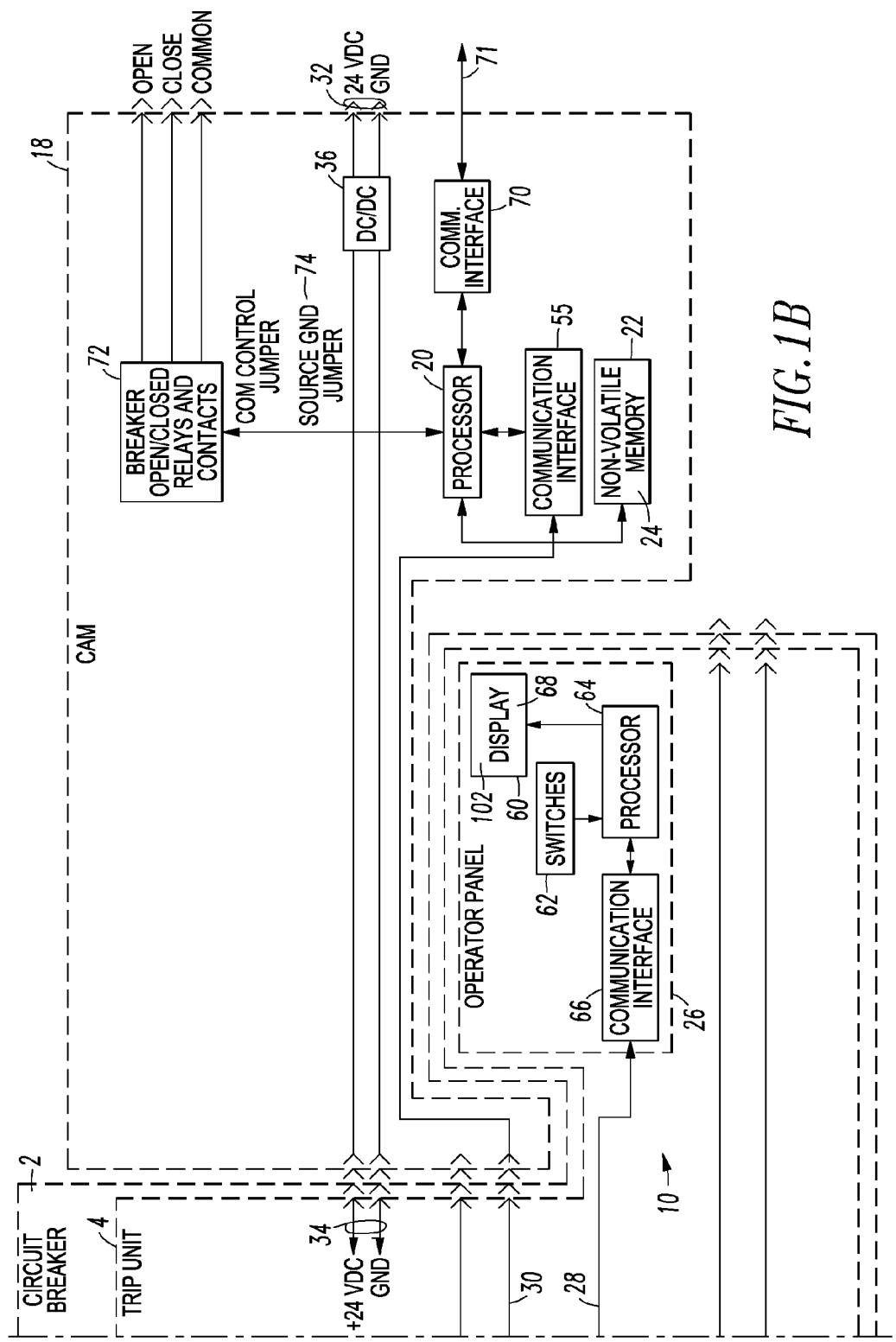
Figure 2:
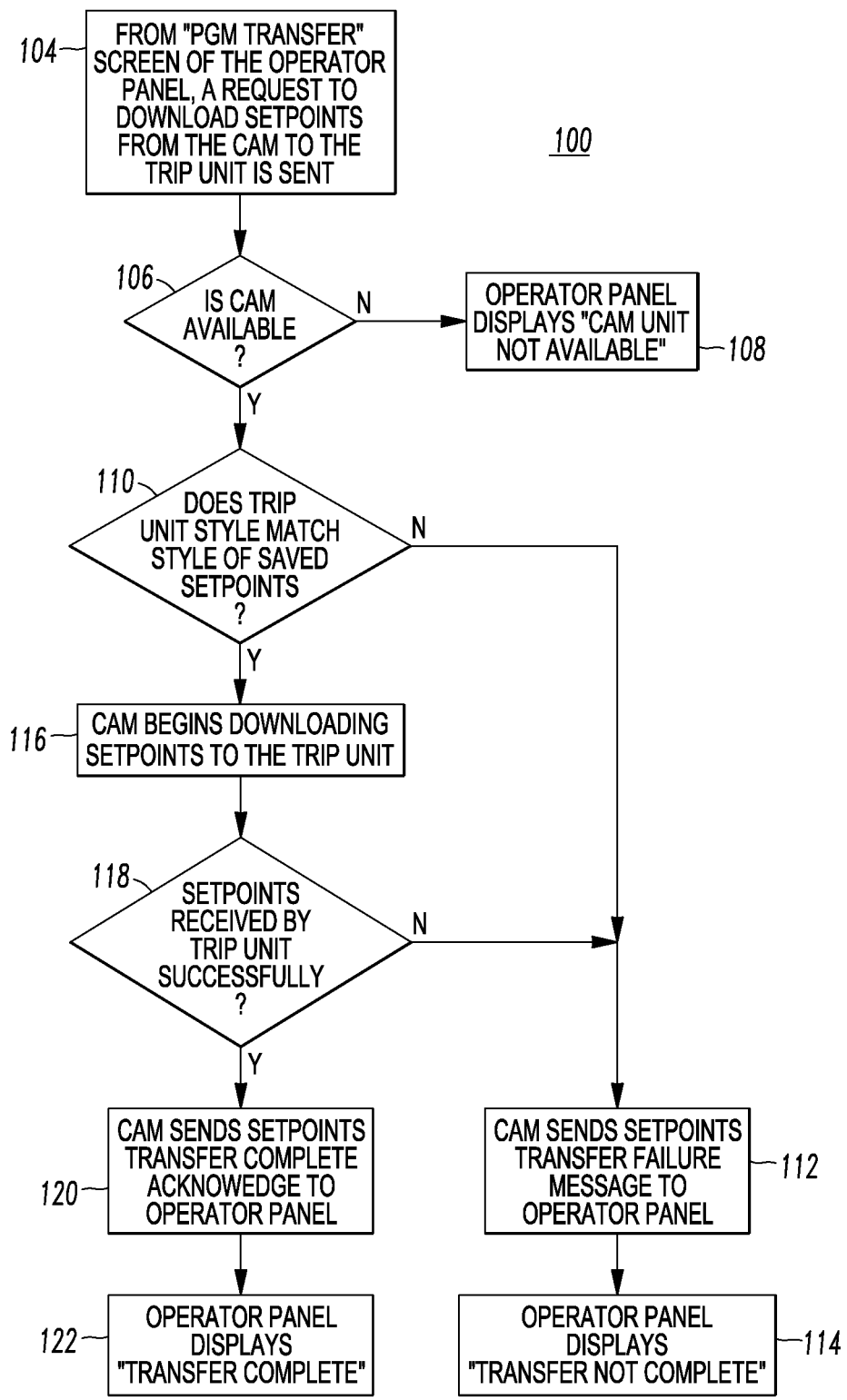
FIG. 2 is a flowchart of a routine to download saved settings from the communication adapter module to the protection processor of FIGS. 1A-1B.
Figure 3:
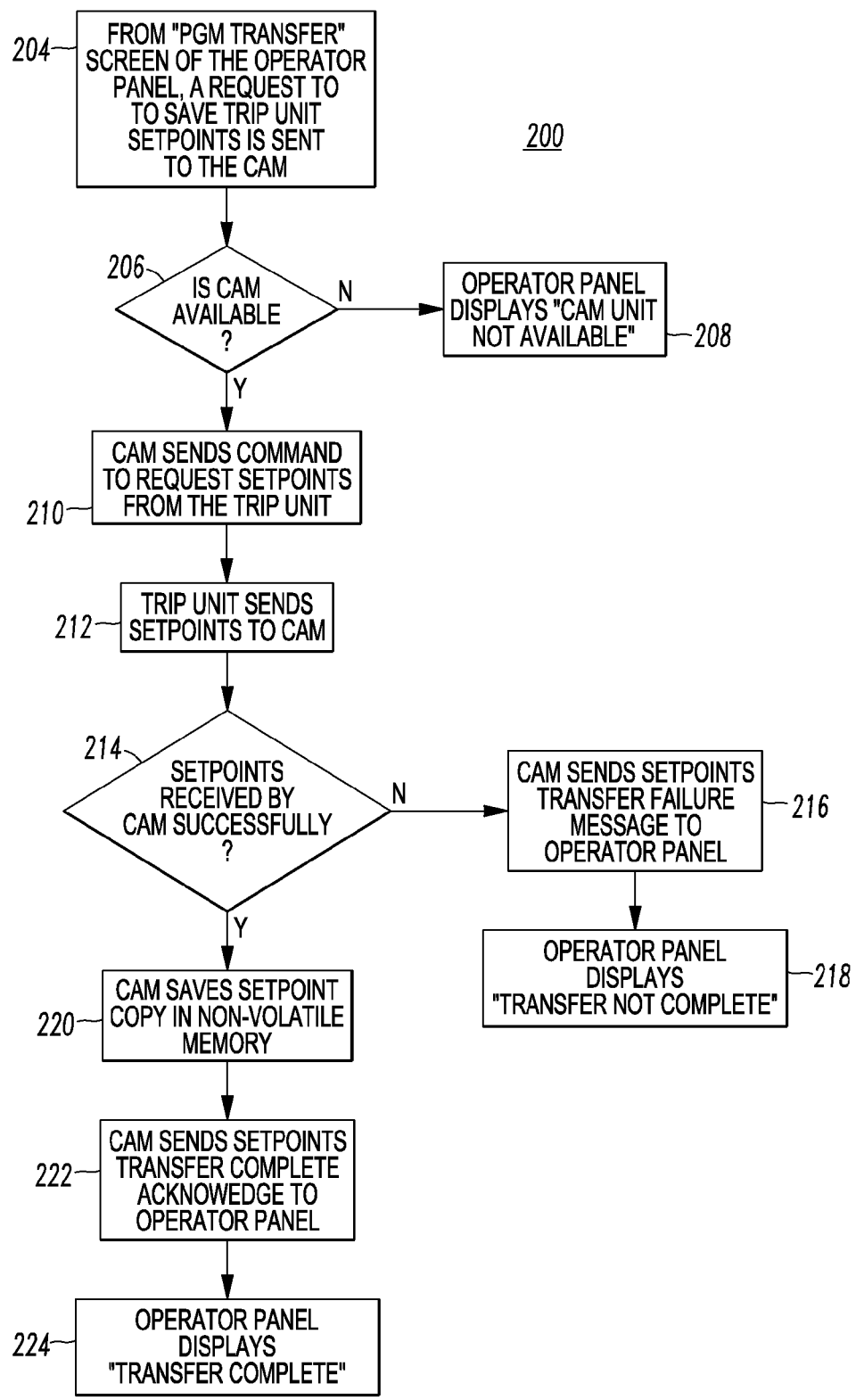
FIG. 3 is a flowchart of a routine to upload trip unit settings from the protection processor to the communication adapter module of FIG. 1B.

Referring to FIGS. 1A-1B, a circuit breaker 2 including a trip unit 4 is shown. The circuit breaker 2 also includes separable contacts 6 and an operating mechanism, such as the example trip actuator (TA) 8 structured to open and close the separable contacts 6. The trip unit 4 cooperates with the trip actuator 8 to trip open the separable contacts 6. The trip unit 4 includes a first component, such as the example protection processor (PP) 10, having a processor 12 and a first memory 14 storing a first set of a plurality of trip unit settings 16, and a second component, such as the example communication adapter module (CAM) 18, which is separable from the example PP 10 or separable from the trip unit 4. The example CAM 18 includes a processor 20 and a second memory, such as the example non-volatile memory 22, storing a second set of a plurality of trip unit settings 24. The example CAM 18, as will be discussed, below, in connection with FIGS. 2 and 3, is structured to save the trip unit settings 16 as the saved settings 24 in the second memory 22, and to restore the saved settings 24 in the first memory 14 of the PP 10 or of another PP (not shown) of another trip unit (not shown). Hence, if the trip unit 4 or PP 10 fails, then the CAM 18 can be separated therefrom and installed on another trip unit (not shown) or PP (not shown), and the saved settings 24 can be downloaded from the CAM memory 22 to the trip unit memory 14 of the other trip unit or PP. The PP 10 saves the saved settings 24 in the separable CAM 18 and provides the ability to restore those settings 24 in a replacement trip unit (not shown) or PP (not shown).

The example trip unit 4 is partitioned into three example independent functional sections: (1) the PP 10; (2) an operator panel 26; and (3) the CAM 18, that communicate, for example, through two example full-duplex serial links 28,30 (e.g., without limitation, RS-422): (1) the serial link 28 is between the PP 10 and the operator panel 26; and (2) the serial link 30 is between the PP 10 and the CAM 18. Each of the PP 10, the operator panel 26 and the CAM 18 is, thus, structured to communicate through one or both of the example full-duplex serial links 28,30.

The trip unit 4 includes one style of a plurality of different styles (e.g., without limitation, N11RLSIG, N11RLSI, N11RLSIA, N11IEC, N11IECEF, N11RIEC, N11RIECEF, N11LSIG, N11LSI, and N11LSIA) (e.g., the "R" means that the style has an arc reduction maintenance (ARM) or maintenance mode feature; the "LSI" means long delay, short delay and instantaneous protection; the "LSIA" means long delay, short delay, instantaneous protection and ground alarm; the "LSIG" means long delay, short delay, instantaneous and ground protection; the "IEC" means international LSI (long delay, short delay and instantaneous protection); and the "IECEF" means international LSI with earth fault or ground protection). The CAM 18 is structured to save a representation of the one particular style of the particular trip unit 4 in the non-volatile memory 22.

Example +24 VDC control power 32 is connected to the CAM 18 (if the CAM 18 is part of the circuit breaker 2). The CAM 18 then sends +24 V 34 to the trip unit 4 via a DC/DC converter 36 in the CAM 18 that provides galvanic isolation between the +24 VDC control power 32 and the trip unit 4. If no CAM 18 is present, then a separate +24 V power supply (not shown) is employed for each trip unit, such as 4, in order to maintain isolation between multiple trip units (not shown).

The PP 10 provides the protective function of the trip unit 4. The PP 10 receives a plurality of inputs, such as 38, employed to perform the protective function and operates independently to open the circuit breaker 2. Protection settings 16 of the trip unit 4 are saved redundantly as the saved settings 24 in the CAM non-volatile memory 22. An example limited human interface 40 is provided on the PP 10 and includes, for example, trip and status indicators. Entry or adjustment of the settings 16,24 can be accomplished through serial communication with either the operator panel 26 or the CAM 18.

The PP 10 can also output to a number of trip and status indicators, such as a plurality of cause of trip LEDs 46. A +3 VDC battery 42 in a frame rating module/bridge circuits interface 44 provides redundant power for the cause of trip LEDs 46. If the circuit breaker 2 were to trip and control power is lost, then the LED states are maintained in a latch 48 by the battery 42. This battery 42 can be located at any suitable position on the trip unit 4.

The PP 10 provides the circuit breaker protective function responsive to the plurality of inputs 38 and the trip unit settings 16, operates independently responsive to the protective function to open the circuit breaker 2, and stores the trip unit settings 16 in the first memory 14. The protective function and other functions provided by the PP 10 can include, for example and without limitation, current and voltage protection, metering, waveform capture, event logging, a real time clock 50, expanded earth fault protection, health buffers, expanded self-diagnostics, and relay control.

The processor 12 of the PP 10 can enter or adjust the trip unit settings 16 through communication with either one of the operator panel 26 and the CAM 18. The processor 12 can be a digital signal processor (DSP) and includes a communication interface 52 that communicates with the operator panel 26, and a communication interface 54 that communicates with the CAM communication interface 55.

A high instantaneous trip circuit 56 is a separate analog peak detecting circuit set to match the withstand rating of the frame of the circuit breaker 2. The high instantaneous trip circuit 56 can trip the circuit breaker 2 without any intervention by the processor 12. This provides trip operation faster than a short delay setting and acts as a fail-safe in the event of a failure of the processor 12.

A making current release (MCR) circuit 58 is a safety feature that prevents the circuit breaker 2 from being closed and latched-in on a fault. This is an non-adjustable sensing circuit.

The PP 10, as shown, also includes the operator panel 26. The operator panel 26 includes a display, such as the example LCD display 60, and a plurality of entry members, such as the example pushbuttons or switches 62, structured to enter or adjust the trip unit settings 16. A processor 64 outputs to the example display 60 and inputs from the example switches 62. This permits an operator to perform a number of functions including, for example and without limitation, setpoint entry or adjustment by inputting from the switches 62, in order to enter or adjust the trip unit settings 16.

The operator panel 26 provides the human interface for the trip unit 4. Typically, the operator panel 26 is coupled to or part of the PP 10 and, preferably, is field replaceable. The operator panel 26, which provides display functions and a user interface, includes the processor 64 and the a communication interface 66.

An inter-unit communication protocol permits the operator panel 26 to request via the processor 12 that the CAM 18 acquire (upload) the current trip unit settings 16 from the trip unit 4 and save them as the saved settings 24 in the CAM non-volatile memory 22. The operator panel 26 can request via the processor 12 that the CAM 18 upload the (changed) trip unit settings 16 from the PP 10 and save the (changed) settings 16 as the saved settings 24 in the CAM non-volatile memory 22. The operator panel 26 can also change a number of the trip unit settings 16 at the PP 10 and request via the processor 12 that the CAM 18 upload the (changed) trip unit settings 16 from the PP 10 and save the (changed) settings 16 as the saved settings 24 in the CAM non-volatile memory 22.

Also, the operator panel 26 can request via the PP 10 that the CAM 18 download the saved settings 24 to the trip unit 4. The operator panel 26 can further request via the PP 10 that the CAM 18 download the saved settings 24 to the PP 10 to save the saved settings 24 as the trip unit settings 16 in the memory 14.

The operator panel display 60 includes a user menu 68 structured to request via the PP 10 that the CAM 18 download the saved settings 24 in the non-volatile memory 22 to a replacement PP 10 to store in the memory 14 thereof.

The CAM 18 includes a second communication interface 70 that provides a connection to a communication network (e.g., without limitation, a field bus 71). For example, multiple styles of the CAM 18 can be provided to support various field bus interfaces (e.g., without limitation, Modbus®; PROFI BUS PROCESS FIELD BUS®; INCOM; Ethernet). Examples of the INCOM network and protocol are disclosed in U.S. Pat. Nos. 4,644,547; 4,644,566; 4,653,073; 5,315,531; 5,548,523; 5,627,716; 5,815,364; and 6,055,145, which are incorporated by reference herein. Hence, the CAM 18 can be selected from a plurality of different CAMs (not shown) to provide an interface to a selected one of a plurality of corresponding different field busses (not shown).

The CAM 18 includes the non-volatile memory 22, or a reserved area of such memory 22, to store the saved settings 24, which are a copy of the trip unit settings 16.

The CAM 18 further includes a set 72 of breaker open/close relays and contacts. Circuit breaker open and close relays (not shown) are controlled by the CAM processor 20 to control relay contacts (not shown) in response to a communication request through the communication interface 70 for opening or closing the circuit breaker 2. A motor operator (not shown) could be wired through the close relay contact to close the circuit breaker 2, while a circuit breaker shunt trip (not shown) would be wired through the open relay contact to open the circuit breaker 2.

A "source ground" jumper 74 on the CAM 18 selects between residual ground current computation by the processor 12, or direct measurement of ground current via an external ground current transformer (CT) (not shown). There are two ground fault modes that the circuit breaker 2 can be configured for: source ground or residual ground. The trip unit processor 12 inputs a jumper input 76 to determine the selected configuration for the circuit breaker 2. With the jumper 74 in, the circuit breaker 2 is in a source mode, and without the jumper 74, the circuit breaker 2 is in a residual mode.

The CAM 18 and operator panel 26 are structured to communicate with each other via the PP 10.

FIG. 2 shows a routine 100 to download the saved settings 24 from the CAM 18 to the PP 10 of FIGS. 1A-1B. From a program transfer screen 102 of the operator panel display 60, at 104, the operator panel 26 sends a request to download the saved settings 24 (e.g., setpoints) from the CAM 18 to the trip unit 4. Next, at 106, if the CAM 18 is not available, then the operator panel display 60 displays "CAM Unit not available" at 108. Otherwise, if the CAM 18 is available, at 106, then the CAM 18 determines, at 110, if the trip unit style matches the saved trip unit style of the saved settings 24. Here, the CAM 18 checks that the particular style of the particular trip unit 4 matches the saved representation of the particular trip unit style in the non-volatile memory 22 before downloading the saved settings 24 to the PP 10 to save these settings 24 as the trip unit settings 16 in the trip unit memory 14. If there is not a match, then at 112 the CAM 18 sends a setpoints transfer failure message to the operator panel 26, which displays on the display 60 "Transfer not complete" at 114. This prevents inappropriate settings from being set in a replacement trip unit that might have a style different from that of a failed trip unit being replaced. Otherwise, if the trip unit style matches the saved trip unit style of the saved settings 24, then, at 116, the CAM 18 begins downloading the saved settings 24 to the trip unit 4. If the saved settings 24 are not received successfully by the trip unit 4 at 118, then at 112 the CAM 18 sends the setpoints transfer failure message to the operator panel 26. Otherwise, at 120, the CAM 18 sends a setpoints transfer complete acknowledge to the operator panel 26, which displays "Transfer Complete" at 122.

FIG. 3 shows a routine 200 to upload the trip unit settings 16 from the PP 10 to the CAM 18 of FIG. 1B. From the program transfer screen 102 of the operator panel display 60, at 204, the operator panel 26 sends a request to save the trip unit settings (e.g., setpoints) 16 to the CAM 18 from the trip unit 4. Next, at 206, if the CAM 18 is not available, then the operator panel display 60 displays "CAM Unit not available" at 208. Otherwise, if the CAM 18 is available, at 206, then at 210 the CAM 18 sends a command to the trip unit 4 to request the trip unit settings 16 from the trip unit 4. The trip unit 4 responds at 212 and sends the trip unit settings 16 to the CAM 18. If these settings 16 are not received successfully by the CAM 18 at 214, then at 216 the CAM 18 sends a setpoints transfer failure message to the operator panel 26, which displays "Transfer not complete" at 218. Otherwise, if the trip unit settings 16 are received successfully by the CAM 18 at 214, then at 220 the CAM 18 saves a copy of these settings 16 as the saved settings 24 in the CAM non-volatile memory 22. Then, at 222, the CAM 18 sends a setpoints transfer complete acknowledge to the operator panel 26, which displays "Transfer Complete" at 224.

The CAM 18 is structured to change the trip unit settings 16 of the PP 10 via a request from the field bus 71 through the communication interface 70, and then employ the routine 200, starting at 206, to automatically save the changed trip unit settings 16 as the saved settings 24 in the CAM non-volatile memory 22.

The restoration process for the trip unit settings 16 includes: (1) whenever these settings 16 are changed through the operator panel 26, the operator panel 26 requests via the PP 10 that the CAM 18 upload the new changed settings 16 to the CAM non-volatile memory 22 using the routine 200; (2) if these settings 16 are changed through the CAM 18 via a request from the field bus 71, then the CAM 18 automatically retains a copy of the new settings 16 as the saved settings 24; (3) when a replacement trip unit or PP is installed, the installer requests through the user menu 68 on the operator panel display 60 via the PP 10 that the CAM 18 download the saved settings 24 to the trip unit 4 or PP 10 using the routine 100; and (4) the CAM 18 checks at 110 of FIG. 2 to ensure that the particular trip unit style of the trip unit 4 matches the particular trip unit style of the saved settings 24 prior to the download, and the CAM 18 rejects the request if the new trip unit style is not identical to the trip unit style of the saved settings, in order to prevent inappropriate settings from being set in a replacement trip unit that has a style different from that of the trip unit being replaced.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A trip unit comprising:

a first component comprising a processor and a first memory storing a first set of a plurality of trip unit settings; and a second component of said trip unit, said second component being separable from said trip unit, said second component comprising a second memory storing a second set of a plurality of trip unit settings, said second component being structured to save the first set of the plurality of trip unit settings as the second set of the plurality of trip unit settings in the second memory, and to restore the second set of the plurality of trip unit settings in the first memory of said first component and of another first component of another trip unit, wherein said processor is a protection processor that provides a protective function for a circuit breaker responsive to said first set of the plurality of trip unit settings;

wherein said first component further comprises an operator panel;

wherein said protection processor is structured to communicate with said operator panel and to communicate with said second component;

wherein said operator panel is structured to request that said second component download the second set of the plurality of trip unit settings to said protection processor to save said second set as said first set in the first memory;

wherein said trip unit includes one style of a plurality of different styles; wherein said second component is further structured to save a representation of said one style in said second memory; and wherein said second component is still further structured to check that the one style of said trip unit matches the saved representation of the one style in said second memory before downloading the second set of the plurality of trip unit settings to said protection processor to save said second set as said first set in the first memory.

* * * * *